(12) United States Patent
Haaland et al.

(10) Patent No.: US 9,415,996 B2
(45) Date of Patent: Aug. 16, 2016

(54) SORPTION PUMPS AND STORAGE FOR GASES

(71) Applicant: BlackPak, Inc., San Francisco, CA (US)

(72) Inventors: Peter Haaland, Fraser, CO (US); Dylan Bethel, Oakland, CA (US)

(73) Assignee: BlackPak, Inc., San Francisco, CA (US)

( * ) Notice: Subject to any disclaimer, the term of this patent is extended or adjusted under 35 U.S.C. 154(b) by 57 days.

(21) Appl. No.: 14/461,577

(22) Filed: Aug. 18, 2014

(65) Prior Publication Data
US 2016/0046480 A1    Feb. 18, 2016

(51) Int. Cl.
*B67D 7/80*        (2010.01)
*B01D 53/04*     (2006.01)
*F17C 11/00*     (2006.01)

(52) U.S. Cl.
CPC *B67D 7/80* (2013.01); *B01D 53/04* (2013.01); *F17C 11/005* (2013.01); *F17C 11/007* (2013.01)

(58) Field of Classification Search
CPC ........ B01D 53/02; F17C 11/00; F17C 11/007
USPC ........ 95/90, 115, 143; 96/108, 112, 116, 146; 206/0.7; 429/515
See application file for complete search history.

(56) References Cited

U.S. PATENT DOCUMENTS

| | | | |
|---|---|---|---|
| 3,172,748 A | 3/1965 | Feinleib et al. | |
| 3,264,803 A | 8/1966 | Read | |
| 3,713,273 A * | 1/1973 | Coffee | B01D 53/0438 95/143 |
| 6,027,547 A * | 2/2000 | Tom | B01D 53/02 95/106 |
| 6,974,496 B2 | 12/2005 | Wegeng et al. | |
| 7,648,568 B2 * | 1/2010 | Arnold | F17C 1/14 502/526 |
| 8,101,133 B2 * | 1/2012 | Ackley | B01D 53/0431 141/1 |
| 8,302,409 B2 | 11/2012 | Fukuda | |
| 8,454,730 B2 * | 6/2013 | Von Helmolt | F17C 11/005 209/0.7 |
| 8,500,852 B2 | 8/2013 | Galbraith | |
| 8,597,410 B2 * | 12/2013 | Tung | B82Y 30/00 502/526 |
| 2005/0188847 A1 * | 9/2005 | Fujita | F17C 11/005 96/126 |
| 2006/0266219 A1 * | 11/2006 | Ovshinsky | B01D 53/0407 96/108 |
| 2007/0261552 A1 * | 11/2007 | Arnold | B01J 20/3458 95/114 |
| 2013/0220479 A1 * | 8/2013 | Luo | F17C 5/06 141/4 |

FOREIGN PATENT DOCUMENTS

| | | |
|---|---|---|
| CA | 2402510 | 9/2001 |
| DE | 102009040947 A1 * | 3/2011 |
| DE | 102014104183 | 10/2014 |
| JP | 111111322 | 4/1999 |
| WO | 2010087723 | 8/2010 |

OTHER PUBLICATIONS

Schmitz, B. et al., "Heat of adsorption for hydrogen in microporous high-surface area materials," Chem. Phys. Chem. (2008) 9(15):2181-2184 (first published online Sep. 26, 2008).

(Continued)

*Primary Examiner* — Frank Lawrence
(74) *Attorney, Agent, or Firm* — Michael Best & Friedrich LLP

(57) ABSTRACT

A method and system for filling gas storage vessels from a source operates by cooling a sorbent, opening a valve to transfer gas by physisorption, regulating the sorbent temperature to achieve the desired degree of filling, closing the valve connecting to the gas source, and warming the tank, sorbent, and gas to provide a predetermined pressure at room temperature.

17 Claims, 5 Drawing Sheets

(56) References Cited

OTHER PUBLICATIONS

Strizhenov, E.M. et al., "Low temperature adsorption of methane on microporous Au-1 carbon adsorbent," Protection of Metals and Physical Chemistry of Surfaces (2014) 50(1):15-21.

Search Report of the International Searching Authority for Application No. PCT/US2015/045618 dated Nov. 11, 2015 (6 pages).
Written Opinion of the International Searching Authority for Application No. PCT/US2015/045618 dated Nov. 11, 2015 (6 pages).

\* cited by examiner

SORPTION PUMPS AND STORAGE FOR GASES

STATEMENT OF GOVERNMENT INTEREST

This invention was made with government support under Contract No. DE-AR0000462, awarded by the U.S. Department of Energy. The government has certain rights in the invention.

TECHNICAL FIELD

The present disclosure relates generally to transferring gaseous fuel into a tank at reduced temperatures through sorption onto cooled porous media. A device that combines features of a storage tank and a sorption pump is also disclosed.

BACKGROUND

The use of natural gas as a fuel for internal combustions engines is increasing because of its low cost, availability, and clean burning characteristics. Current storage methods based on liquefied, compressed, and adsorbed natural gas require a storage vessel or tank to be supplied with gas at elevated pressures. In the case of liquefied natural gas a compressor is used to cool and liquefy gas by adiabatic expansion. In the case of compressed natural gas, a mechanical compressor is used to increase the pressure in the storage vessel to tens of MPa. Gas is also compressed to fill adsorbed natural gas tanks at pressures between about 3 MPa and about 25 MPa.

A problem with current methods of filling natural gas tanks is that pressurizing flammable natural gas is hazardous and requires mechanical compressors with multiple stages to prevent thermal decomposition of the gas. Filling an absorbed natural gas tank generates heat from compression of the gas, friction between moving pump parts, and, through the enthalpy of adsorption, from binding of the gas to the sorbent. Therefore, a second problem with current methods of filling adsorbed natural gas tanks is management of heat produced by compression and adsorption. Thus, there exists a need for improved systems and methods for filling and storing tanks with natural gas.

SUMMARY

In one aspect, disclosed is a method of transferring a gas from a source to a vessel, the method comprising: (i) cooling a sorbent material within the vessel; (ii) opening a valve to transfer gas by physisorption from the source to the vessel; (iii) regulating the temperature of the sorbent material to control the gas transfer; (iv) closing the valve connecting the vessel to the source of gas; and (v) warming the vessel, sorbent, and gas. The warming of the vessel, sorbent and gas can provide a predetermined pressure (e.g., 35 bar) at a selected temperature (e.g., ambient temperature).

In certain embodiments, the storage capacity of the sorbent material, defined as the ratio of liter-atmospheres of gas stored to liters of sorbent volume, is greater than one.

In certain embodiments, the sorbent material is one or more of zeolites, porous glass, porous carbon, metal-organic framework materials, microporous polymers, and clay.

In certain embodiments, the gas is a hydrocarbon or hydrogen fuel.

In certain embodiments, the gas is thermally unstable when subjected to mechanical compression.

In another aspect, disclosed is a system for pumping gas, storing gas, or a combination thereof, the system comprising: a sorbent material; a thermal conductor in contact with the sorbent material; a pressure vessel; a valve configured to connect the pressure vessel to a source of gas; and optionally a thermally insulating layer; wherein the sorbent material and the thermal conductor are disposed within the pressure vessel. The temperature of the sorbent material can be controlled with the thermal conductor in contact with a thermal bath at a different temperature.

In certain embodiments, the thermal conductor is thermally connected to a cooling source, a heating source, or a combination thereof.

In certain embodiments, the thermal conductor comprises: one or more thermoelectric plates in thermal contact with the sorbent material; a second thermal conductor in thermal contact with the one or more thermoelectric plates; a thermal bath in thermal contact with the second thermal conductor; and a source of electrical power connected to the one or more thermoelectric plates.

In certain embodiments, the thermal conductor comprises one or more tubes perforating the sorbent material. The tubes can be configured to receive a flow of a refrigerated liquid, a heated liquid, a cooled gas, a heated gas, or a combination thereof. The flow of the refrigerated liquid, the heated liquid, the cooled gas, the heated gas, or a combination thereof, can facilitate heat transfer to the sorbent material, heat transfer from the sorbent material, or a combination thereof.

In certain embodiments, the gas is a flammable hydrocarbon fuel.

In certain embodiments, a pressure transducer is connected to the vessel (e.g., to provide automated operation of valves, cooling elements, heating elements, or combination thereof).

In certain embodiments, one or more temperature sensors are connected to the sorbent material (e.g., to provide automated operation of valves, cooling elements, heating elements, or combination thereof).

In certain embodiments, the system comprises a thermal insulation layer (e.g., a thermal insulation layer between the pressure vessel inner wall and the sorbent material/thermal conductor; a thermal insulation layer on the exterior wall of the pressure vessel; or a combination thereof).

In certain embodiments, cooling of the sorbent is accomplished by detaching the vessel and placing it in a cooled environment (e.g., a refrigerator or freezer). Thus, the pressure vessel can be configured to be detachable from the source of gas. Preferably, such a detachable vessel configured for cooling (e.g., in a refrigerator or freezer) does not include a thermal insulating layer.

In certain embodiments, the system comprises a second valve providing a fluid connection from the pressure vessel to a second vessel.

In certain embodiments, the system can be configured for use with a vehicle, a generator, or another platform that requires gaseous fuel.

In another aspect, disclosed is a method of manufacturing a system for pumping gas, storing gas, or a combination thereof, the system comprising a sorbent material, a thermal conductor in contact with the sorbent material, a pressure vessel, and a valve configured to connect the pressure vessel to a source of gas, wherein the sorbent material and the thermal conductor are disposed within the pressure vessel, the method comprising: (1) placing at least a portion of the sorbent material and at least a portion of the thermal conductor in contact; and enclosing the sorbent material and thermal conductor in the pressure vessel; or (2) placing the sorbent material in the pressure vessel including the thermal conductor, such that at least a portion of the sorbent material and at least a portion of the thermal conductor are in thermal contact.

In certain embodiments, the placing of at least a portion of the sorbent material and at least a portion of the thermal conductor in thermal contact comprises packing sorbent material around an array of thermally conductive tubing configured to receive a flow of heat transfer fluid, heat transfer gas, or a combination thereof.

In certain embodiments, the placing of at least a portion of the sorbent material and at least a portion of the thermal conductor in thermal contact comprises forming a composite of sorbent formed over a three dimensional grid of thermally conductive wires.

In certain embodiments, the placing of the sorbent material in the pressure vessel including the thermal conductor comprises filling the pressure vessel with sorbent through a flange.

DETAILED DESCRIPTION

Disclosed are systems and methods for filling gas fuel tanks (e.g., natural gas fuel tanks) from a source of gas. The systems and methods operate by cooling a sorbent within a vessel and transferring gas to the vessel by physisorption to the sorbent. Gas can be transferred, for example, by opening a valve to transfer gas by physisorption. The sorbent temperature can be regulated to achieve the desired degree of filling. Once the desired degree of filling is achieved, the transfer of gas to the sorbent can be discontinued (e.g., by closing a valve connecting to the gas source). The vessel, sorbent, and gas can then be warmed to provide a predetermined pressure at room temperature.

Figure 1:
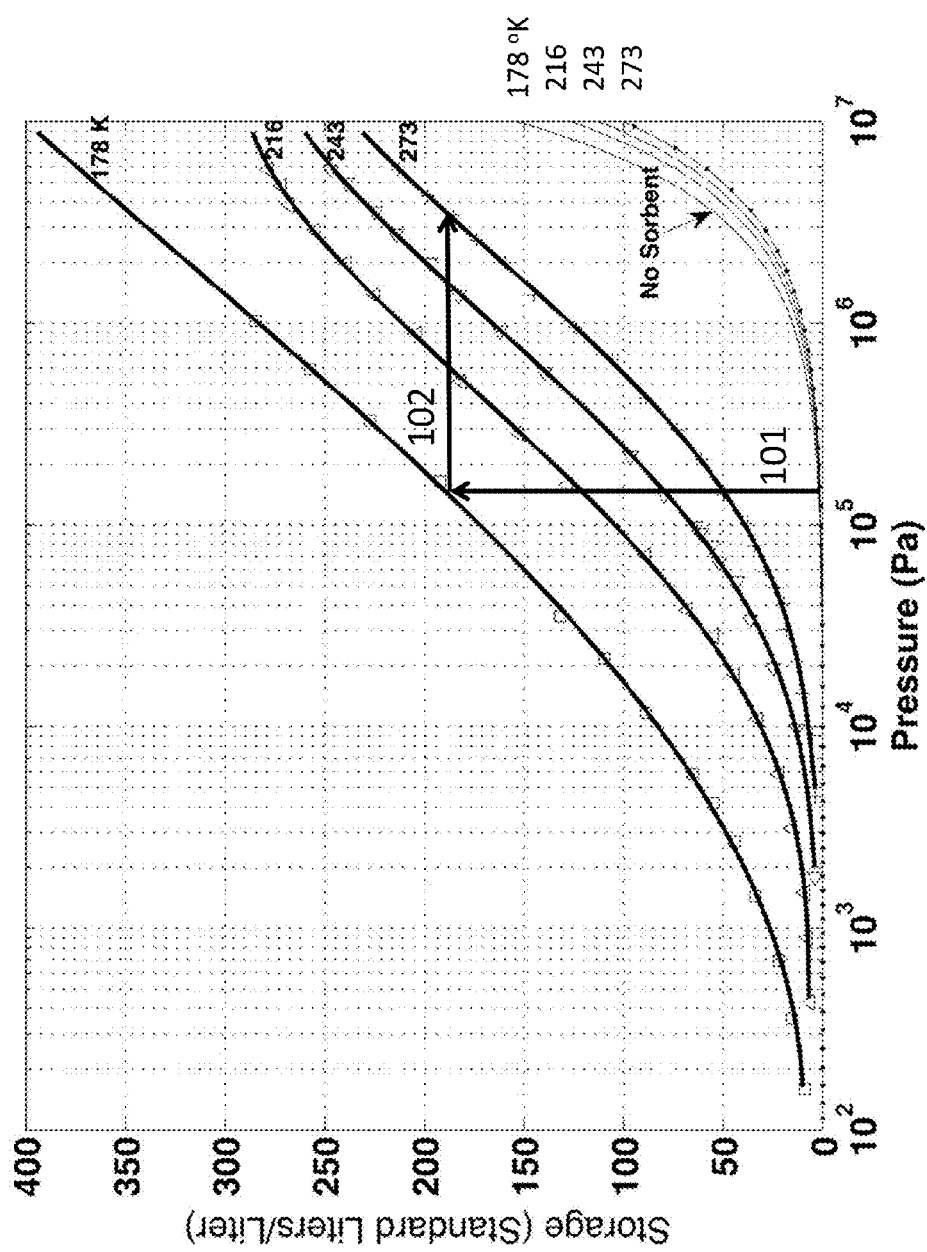
FIG. 1 is a plot of isotherms for methane with no sorbent and a typical activated carbon sorbent at 273° K and at 273° K, 243° K, 213° K, and 178° K.

The present disclosure exploits the fundamental thermodynamics of physisorption to accomplish charging of storage tanks with gaseous fuel at or near atmospheric pressure (~100 kPa). A pressure vessel with no sorbent has storage capacity, herein defined as the ratio of the quantity of stored gas in standard liters divided by the vessel volume, that is directly proportional to pressure and inversely proportional to temperature. Sorbents such as zeolites, activated carbons, metal-organic framework materials, and the like within the tank weakly bind the gas and qualitatively change these relationships so that a plot of storage capacity versus pressure at fixed temperature, also called an isotherm, surpasses that of an empty vessel. Referring to FIG. 1, four isotherms at 273° K, 243° K, 216° K, and 178° K for a typical carbon-based sorbent show storage capacity substantially exceeding that for a vessel with no sorbent at the same temperatures. [see, e.g., Strizhenova et al. Protection of Metals and Physical Chemistry of Surfaces, 2014, Vol. 50, No. 1, pp. 15-21. © Pleiades Publishing, Ltd., 2014. 4 Apr. 2014]. At one atmosphere pressure ($10^5$ Pa) and 273° K, for example, a one liter, sorbent-free tank contains 1 liter-atmosphere of methane, while the sorbent-filled container holds 40, 65, 105, and 173 liter-atmospheres at 273° K, 243° K, 216° K, and 178° K, respectively.

The maximum quantity of gas stored is determined by the temperature of the sorbent, the isotherm for the (sorbent+gas) combination, and the fill pressure. Referring to FIG. 1, a utility gas spigot operating at 150 kPa can collect 180 liter-atmospheres of methane in one liter of sorbent if the latter is maintained at 178° K, as shown schematically by the arrow (101). After closing the valve and coupling to a thermal bath at 273° K the pressure in the vessel will rise to 3.2 MPa (30 bar), as indicated by arrow (102). The amount of this gas that is available for use by, for example, an internal combustion engine, depends on the isotherm at the corresponding extraction pressure and temperature in the same manner.

Figure 2:
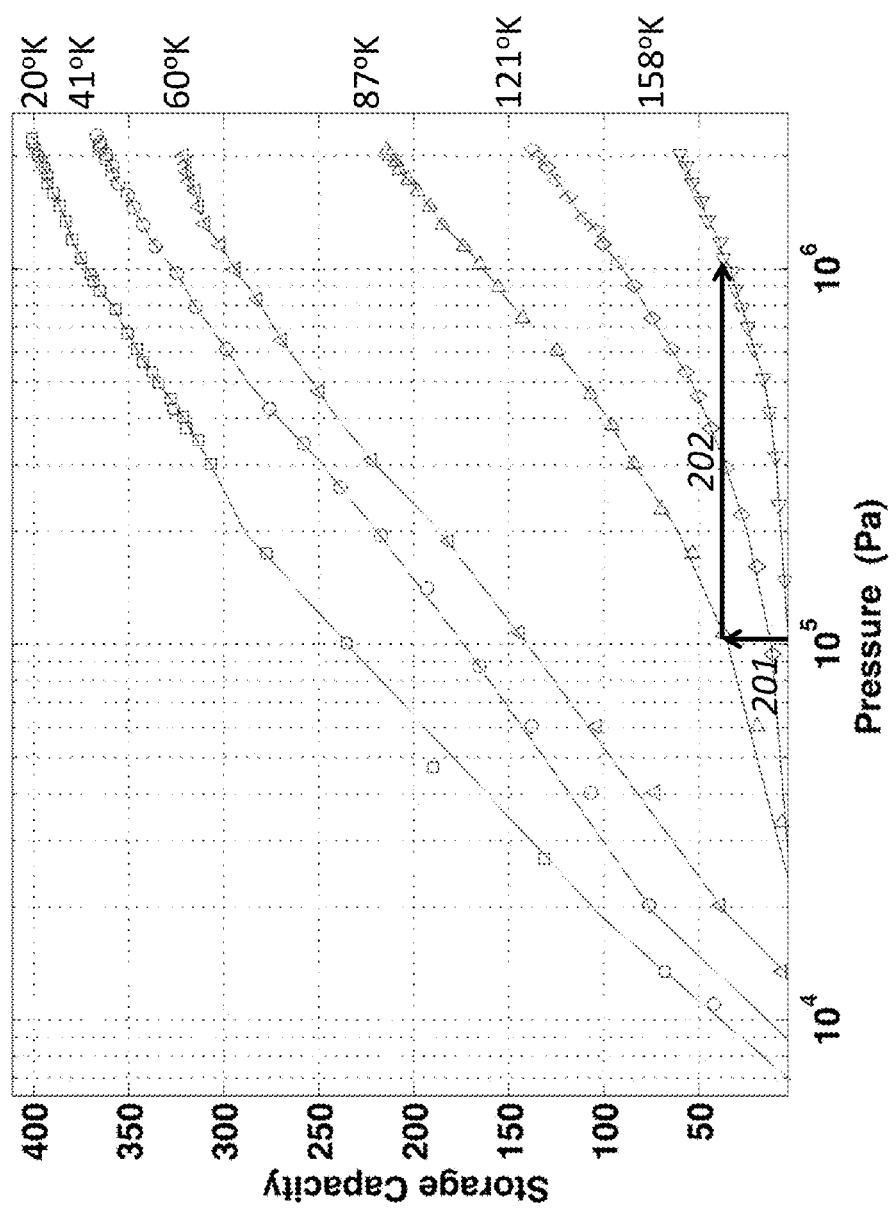
FIG. 2 is a plot of isotherms for hydrogen and a typical metal-organic framework sorbent at 20° K, 41° K, 60° K, 87° K, 121° K, and 158° K.

In addition to natural gas, other gases can be transferred using the disclosed steps of cooling a sorbent, isolating the source, and warming the sorbent to ambient temperatures as outlined above. A series of isotherms for molecular hydrogen on a metal-organic framework sorbent (CuBTC) were measured by Schmitz et al. [Chem. Phys. Chem., 9 (15), 308 (2008)] and shown in FIG. 2 with the presumption that the sorbent density is 1 g/cm$^3$. The enthalpy of physisorption for $H_2$ on this material is less than that of methane on activated carbon, so the temperatures at which sorption provides significant pumping capability are lower than those shown in FIG. 1. A source of $H_2$ at $10^5$ Pa and 160° K can be exposed to a cooled sorbent at 87° K as shown by arrow (201), then sealing the vessel and warming it to 158° K (arrow 202) would result in a pressure of $10^6$ Pa (10 bar). Allowing this vessel to come to room temperature (298° K) would produce a pressure of approximately 40 bar.

The disclosed systems and methods provide several advantages. As one advantage, the disclosed systems and methods permit a desired quantity of gas to be transferred by sorption from a source at fill pressures substantially below 3 MPa and preferably around 100 kPa, whereas conventional adsorbed natural gas tanks require pressures of 3 MPa and above. The need for a compressor to pressurize the gas is thereby reduced or eliminated. As another advantage, the disclosed systems may act as a stand-alone pump or, in a preferred embodiment, combine the function of pumping and storage in a single device.

As another advantage, the disclosed systems allow filling of adsorbed gas tanks at the widely dispersed natural gas distribution system, where delivery pressures are about one bar to about five bar, without requiring compressors that are hazardous and expensive to purchase, operate, and maintain. More generally, the disclosed systems and methods provide for filling storage vessels with gases that are unstable under the conditions of pressure and temperature that are developed in mechanical compressors.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The terms "first," "second," "third," and the like, as used herein, do not denote any order, quantity, or importance, but rather are used to distinguish one element from another.

The term "storage capacity," as used herein, means the amount of stored gas in standard liters divided by the vessel volume in liters.

The term "standard liter," as used herein, refers to the amount of gas contained in one liter at a pressure of 1 atmosphere and a temperature of 0° C.

The term "sorbent," as used herein, means a permeable material that weakly and reversibly binds gas whose surface area provides a storage capacity greater than one.

The term "source of gas," as used herein, may refer to, for example, a natural gas residential or industrial pipeline, a liquified gas reservoir, a tank or cylinder of compressed gas, or a gas generator.

The term "natural gas," as used herein, means a mixture of gases primarily comprised of methane with minor constituents including heavier hydrocarbons, water, carbon dioxide, and trace materials such the sulfur bearing molecules used as odorants.

The term "sorption isotherm," as used herein, means a measured relationship between the quantity (mass or number of moles) of adsorbed gas bound to a sorbent as a function of gas pressure at equilibrium and at a specified temperature.

The term "enthalpy of combustion," as used herein, means the energy released as heat when a compound undergoes complete combustion.

2. SYSTEMS

In one aspect, disclosed are systems for filling tanks (e.g., natural gas fuel tanks) from a source of gas. In certain embodiments, the systems include a sorbent material, a thermal conductor in contact with the sorbent material, a pressure vessel, a valve connecting to a source of gas, and optionally a thermally insulating layer. The sorbent material and the thermal conductor can be disposed within the pressure vessel (also referred to herein as a tank). The optional thermal insulating layer may be disposed within the pressure vessel, outside the pressure vessel, or a combination thereof. The sorbent material can be coupled by fluid communication to the source of gas (e.g. natural gas) via the valve. The valve may be contained within an inlet/outlet connecting the pressure vessel to the source of gas. The thermal conductor can be thermally connected to a cooling source, a heating source, or a combination thereof. The thermal conductor can be used to control the temperature of the sorbent material.

In certain embodiments, a system for filling a tank (e.g., a natural gas tank) includes a sorbent material, a thermally conductive surface in contact with the sorbent material, a cooling source that can be thermally connected to said conductive surface, an ambient thermal bath or heating element that can be thermally connected to said conductive surface, an enclosing vessel that thermally and mechanically isolates the sorbent from the ambient environment, and a valve through which gas (e.g., natural gas) is admitted to the tank. The enclosing vessel may be comprised of a pressure vessel (e.g., one that mechanically isolates the sorbent material), a thermal insulating layer (e.g., one that thermally isolates the sorbent material), or a combination thereof.

Figure 3:
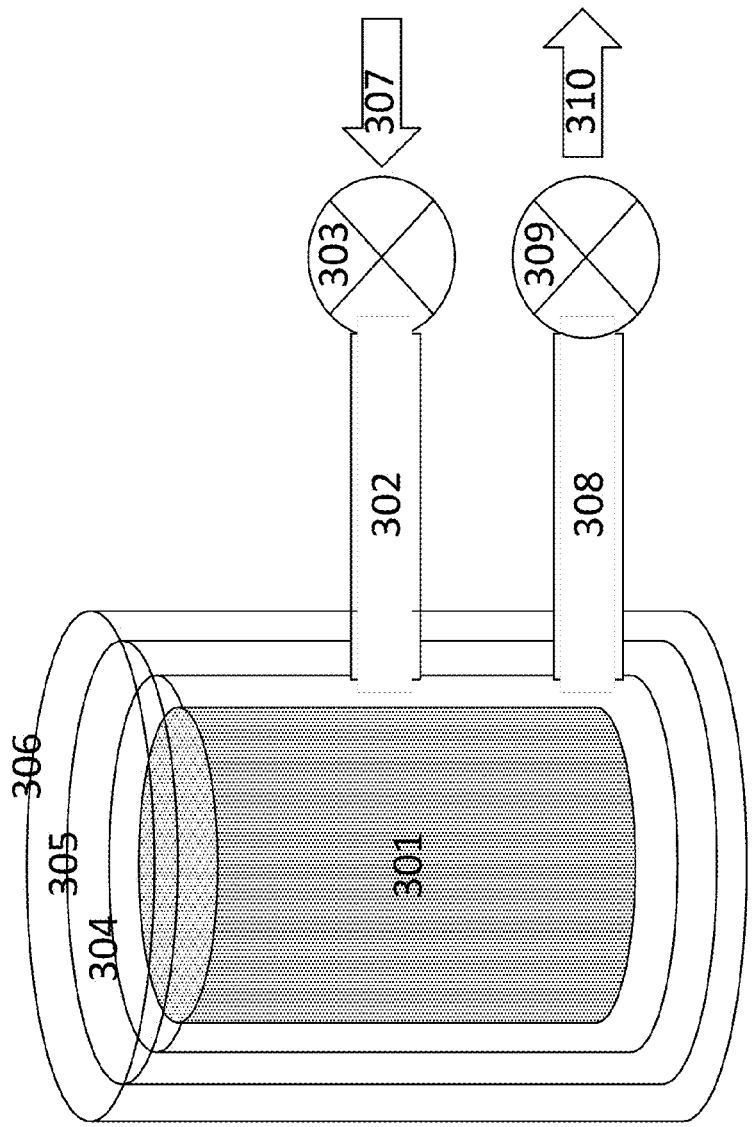
FIG. 3 is a schematic representation of an integrated pump and gas storage vessel.

FIG. 3 shows a schematic representation of one exemplary embodiment of a system for transferring gas (e.g., natural gas) to a tank. Sorbent (301) is coupled by a fluid connection (302) through a valve (303) to a source of natural gas (307). The sorbent (301) is in thermal contact with a thermally conductive, cooled surface (304) such as a thermoelectric element or refrigerant loop. The cooled surface (304) and sorbent (301) are isolated from ambient heat by a thermal insulator (305) and encased in a pressure vessel (306). The insulator (305) may be optionally located either inside or outside of the pressure vessel (306).

In certain embodiments, the system of FIG. 3 can include a second fluid connection (308) and valve (309) that is connected with a second tank and uses the cyclic cooling, filling, and warming of the first tank as a pump to fill the second tank.

In certain embodiments, the disclosed system is provided without thermal insulation (306). For example, the system can be provided as a detachable fuel tank that can be placed in a conventional refrigerator or freezer to cool the sorbent and allow pumping of gas.

Figure 4:
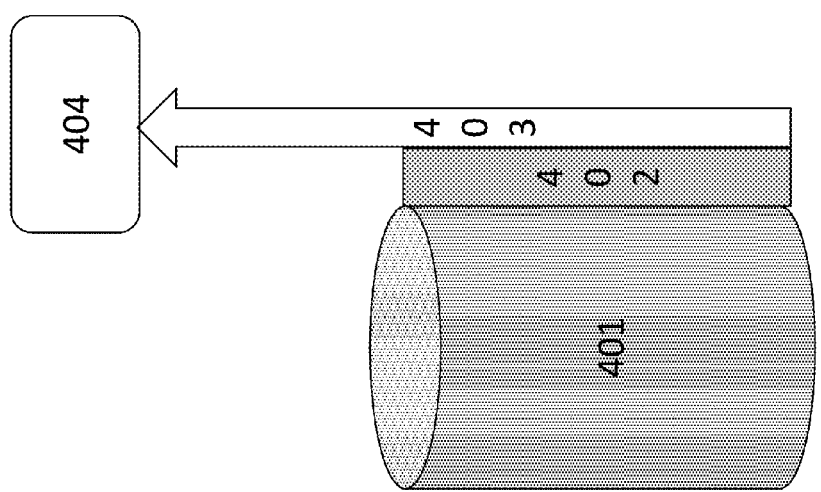
FIG. 4 is a schematic representation of an embodiment that uses a thermoelectric plate adjacent to the sorbent to control the sorbent's temperature.

FIG. 4 shows a schematic representation of another exemplary embodiment of a system for transferring gas (e.g., natural gas) to a tank. The system of FIG. 4 includes one or more thermoelectric elements to provide cooling and heating of the sorbent material within the tank. A thermoelectric element (402) is in thermal contact with the sorbent (401) and a thermal conductor (403) that is in thermal contact with a thermal bath (404). The thermal bath is either a passive object whose heat capacity is much larger than that of the sorbent, or an active system that can generate heat or cooling to maintain a constant temperature as heat flows into and out of the sorbent. Cooling of the sorbent is accomplished by applying an electrical potential and flowing current through the thermoelectric element so that the interface between (401) and (402) is colder than that between (402) and (403). The sorbent can be warmed to ambient temperature by switching the polarity of the potential applied to the thermoelectric plate (402) or raising the temperature of the bath (404). The rate at which heat can be withdrawn from (401) to accommodate gas sorption is a function of the thermoelectric plate power and cooling efficiency, the conductivity of (403), and the temperature of the bath (404).

Figure 5:
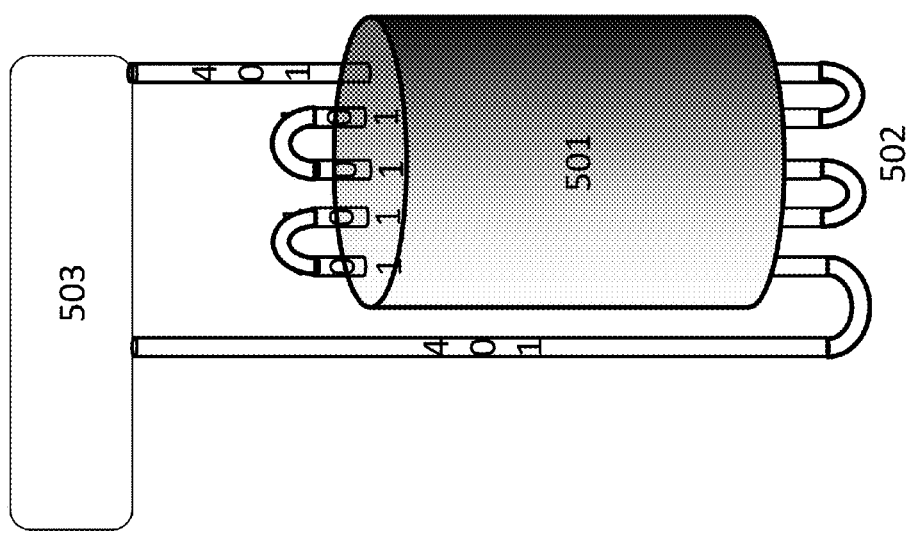
FIG. 5 is a schematic representation of an embodiment that perforates the sorbent with tubing through which heat transfer fluid is flowed to control the sorbent's temperature.

FIG. 5 shows a schematic representation of another exemplary embodiment of a system for transferring gas (e.g., natural gas) to a tank. The system of FIG. 5 uses tubes through which a refrigerant or heat transfer fluid flows as the conductive surface. A series of tubes (502) perforate the sorbent (501) to provide effective heat transfer throughout its volume. The tubes are connected with a source of heat transfer fluid or gas that can alternately cool or warm the sorbent to facilitate gas transfer.

The disclosed systems can include one or more valves to allow for filling of additional tanks at pressures below those achieved on warming the primary tank to ambient temperatures. In other words, the process of cooling and warming the sorbent takes gas at a lower pressure and produces it at a higher pressure, analogous to the action of a mechanical compressor or pump.

The disclosed systems can include a pressure sensor to provide feedback on pressure in the pressure vessel that allows automatic operation of the valves and cooling circuit to control the filling and emptying of the vessel.

The disclosed systems can include one or more temperature probes connected to the sorbent to provide automated control of the thermal circuit and valves.

The disclosed systems can achieve cooling of the sorbent by elimination of the thermal insulation [e.g., thermal insulation (306)] and placing the remaining elements of the system in a cooled environment (e.g., a conventional refrigerator or freezer).

The disclosed systems can be microprocessor controlled.

a. Pressure Vessels

Suitable pressure vessels for use in the disclosed systems include, but are not limited to, metallic, polymeric, or composite barriers whose shape is designed to accommodate space constraints in a vehicle, generator, or other system requiring compressed gas for its operation. Metallic tanks may be fabricated from aluminum, steel, titanium, or other alloys. Polymeric tanks may be fabricated by, for example, reaction injection molding of poly-dicyclopentadiene. Examples of composite tanks can be fabricated from epoxy and carbon or glass fibers. It is apparent that storage of physisorbed gas permits storage of a standard quantity at lower pressure than ordinary compressed storage, so that structural constraints on the shape and size of the adsorbed gas storage tank can be relaxed. In certain embodiments, the pressure vessel is formed from an epoxy-impregnated carbon fiber blanket, preferably including a fitting that allows independent introduction of a gas, and optionally a heat transfer fluid, a heat transfer gas, or combination thereof. In certain embodiments, the pressure vessel is an aluminum or titanium vessel. In certain embodiments, the pressure vessel is formed with polydicyclopentadiene by reaction injection molding and a ring-opening metathesis polymerization.

b. Thermal Conductors

Suitable thermal conductors for use in the disclosed systems include, but are not limited to, metals such as aluminum (k=thermal conductivity=200 W/m-° K), tungsten (k=174 W/m-° K), nickel (k=91 W/m-° K), steel (k=43 W/m-° K), copper (k=394 W/m-° K), or metallic alloys. Nonmetallic thermal conductors such as graphite (k~80 W/m-° K) may also be used. Heat pipes may also be employed as thermal conductors because they facilitate transfer of heat from a hotter to a cooler region using flow of a jacketed liquid. Thermal conductors may take the form of external shells surrounding the sorbent, tubes, or sheets that penetrate the sorbent, or a mesh network that is intercalated within the sorbent. In certain embodiments, the thermal conductor is thermally conductive tubing configured to receive a flow of a heat transfer fluid, a heat transfer gas, or a combination thereof. In certain embodiments, the thermal conductor is the pressure vessel material itself (e.g., an aluminum or titanium pressure vessel). In certain embodiments, the thermal conductor is a three dimensional grid of thermally conductive metal wires, optionally welded to a thermally conductive metal foil that is optionally connected by welding to a metal mounting flange. It is to be understood that combinations of the foregoing thermal conductors can be used.

The temperature of the thermal conductors, and thus the sorbent material, can be controlled using a variety of devices and methods. Suitable devices for controlling the temperature of the thermal conductors include, but are not limited to, an ambient thermal bath thermally connected to the conductor, a heating element thermally connected to the conductor, a source of optical radiation that is absorbed by the sorbent, hot fluid circulating through the radiator of an internal combustion engine, refrigerant gas circulating through a vehicular air conditioning system, or a heat sink that is heated and cooled by forced or unforced convection. Suitable methods for controlling the temperature of the thermal conductors include, but are not limited to, adjusting the voltage and current flow through a thermoelectric element, varying the fluid flow rate or temperature of a heat transfer fluid, adjusting the volumetric flow rate or temperature of a refrigerant gas, varying the intensity or spectrum of illumination of the sorbent by optical radiation, and establishing or breaking thermal contact of the thermal conductor and sorbent with a thermal bath.

c. Sorbent Materials

Suitable sorbent materials for use in the disclosed systems include, but are not limited to, activated carbon, graphite, activated alumina, molecular sieves, aluminophosphate materials, silicoaluminophosphate materials, zeolites, faujasite, clinoptilolite, mordenite, metal-exchanged silico-aluminophosphate, uni-polar resins, bi-polar resins, aromatic cross-linked polystyrenic matrices, brominated aromatic matrices, acrylic polymers, acrylic copolymers, methacrylic polymers, methacrylic copolymers, hydroxyalkyl acrylates, hydroxyalkyl methacrylates, adsorbent carbonaceous materials, adsorbent graphitic materials, carbon fiber materials, nanotubes, nano-materials, adsorbent metal salts (such as perchlorate and oxalate), alkaline earth metal metallic particles, ion exchange resins, linear polymers of glucose, polyacrylamides, or a combination thereof. The zeolite may be an ion exchanged metal zeolite, hydrophilic zeolite, hydrophobic zeolite, modified zeolites metal-ion exchanged zeolite, natural X-type zeolite, modified X-type zeolite, A-type zeolite, mordenite-type zeolite, chabazite-type zeolite, ion exchange resin, bioselective sorbent, or a combination thereof.

The sorbent material may include at least one support. For example, the sorbent may be adhered to or embedded in a support. The support may be, for example, a series of microchannels, laminar sheets, a porous electrode; a series of concentric layers, or a combination thereof. Suitable supports include, but are not limited to, natural clay, calcined clay, modified clay, chemically treated clay, chemically modified clay, smectite clay, kaolin clay, sub-bentonite clay, kaolin-halloysite clay, kaolin-kaolonite clay, kaolin-nacrite clay, kaolin-anauxite clay, binary matrix material, tertiary matrix material, silica-thoria, silica-alumina, silica-alumina-thoria, silica-alumina-zirconia, fibrous material, colloidal silica material, colloidal alumina material, colloidal zirconia material, colloidal mixture, surface modified amorphous silicon dioxide nanoparticles, hydrated magnesium aluminum silicate, thermoplastic polymer, thermosetting polymer, ferrous support, non-ferrous support, electrically-conductive support, dielectric support, electromagnetic receptor, or a combination thereof. The support may be applied by sintering, pyrolysis, slurrying, vapor deposition, casting, electro-spraying, electrophoretic deposition, extrusion, laser deposition, electron beam deposition, silk screening, photo-lithography deposition, electrostatic self-assembly, high aspect ratio micromachining, LIGA-formation, atomic layer deposition, casting, stamping, or a combination thereof.

In certain embodiments, the sorbent material is one or more of zeolites, porous glass, porous carbon, metal-organic framework materials, microporous polymers, and clay.

d. Valves

Suitable valve(s) for use in the disclosed systems include, but not limited to, bonnet valves, gate valves, check valves, Tesla valves, and diode valves, any which may be operated manually or through electromechanical, solenoidal, pneumatic, or hydraulic mechanisms.

e. Thermal Insulating Layers

Suitable thermal insulating layers for use in the disclosed systems include, but are not limited to, materials with thermal conductivity less than 0.5 W/m-K, such as dense or foamed polymers, ceramics, fiberglass, concentric layers with evacuated interstices, and reflective foils. The thermal insulating layer may refer to a material applied to a surface to provide thermal insulation, a vessel or dewar configured to provide thermal insulation, or a combination thereof. In certain embodiments, the thermal insulating layer is polystyrene.

f. Gases and Gas Transfer Pressures

Suitable gases for use in the disclosed systems include, but are not limited to, hydrocarbon gases (e.g., natural gas), methane, hydrogen, dichlorosilane, hydrogen chloride, sulfur dioxide, and industrial gases that decompose above room temperature. The foregoing examples of pressurizing and storing methane and hydrogen on carbon and metal-organic sorbents can be extended to other gases and sorbents. The method of sorption pumping at low temperatures is especially useful for gases that decompose at higher temperatures that generally accompany direct mechanical compression. Examples of thermally unstable gases that may decompose in mechanical compressors are $NH_3$, $Cl_2$, $SiH_2Cl_2$, HBr, $NO_2$, and $SO_2$. Thus, the disclosed systems and methods are suited to integrated pumping and storage of diverse gases that are unstable, uneconomical, or unsafe to pump by mechanical compression.

The disclosed systems can provide for a transfer gas from a source to a tank at fill pressures below 3 MPa. The systems can transfer gas from a source to a tank at fill pressures less than or equal to 2 MPa, less than or equal to 1 MPa, less than or equal to 0.9 MPa, less than or equal to 0.8 MPa, less than or equal to 0.7 MPa, less than or equal to 0.6 MPa, less than or equal to 0.5 MPa, less than or equal to 0.4 MPa, less than or equal to 0.3 MPa, less than or equal to 0.2 MPa, or less than or equal to 0.1 MPa.

3. METHODS OF USE

In another aspect, disclosed are methods for filling tanks (e.g., natural gas fuel tanks) from a source of gas. The methods include cooling a sorbent, opening a valve to transfer gas by physisorption, regulating the sorbent temperature to achieve the desired degree of filling, closing the valve connecting to the gas source, and warming the tank, sorbent, and gas to provide a predetermined pressure at room temperature (e.g., about 20° C. to about 26° C.).

Referring to FIG. 3, in certain embodiments, a disclosed method includes opening the valve (303) after cooling the sorbent (301) with the cooled surface (304) to a temperature that facilitates gas sorption, continuing cooling to remove the enthalpy of sorption from the required quantity of gas, closing valve (303), and providing a thermal connection between the conductive surface and a thermal bath at ambient temperature. The pressure in the tank will thereby increase to a value implied by the isotherm at that ambient temperature.

4. METHODS OF MANUFACTURE

The disclosed systems can be manufactured by, for example, packing sorbent material around an array of thermally conductive tubing through which heat transfer fluid may be introduced. The composite block can then be wrapped in an epoxy-impregnated carbon fiber blanket with a fitting that allows independent introduction of gas and heat transfer fluid to the sorbent and heat transfer manifold, respectively. The shape and thickness of the carbon fiber composite blanket can be optimized to ensure integrity of the vessel and fit of the tank into allocated space on a vehicle, generator, or other platform that requires gas.

Another method of manufacture can start with an aluminum or titanium vessel that is equipped with a flange and filled with sorbent. The tank can be encased in foamed styrene to provide thermal insulation, and the flange can be clamped to a fixture that can be heated and cooled to control the metal and sorbent temperatures. Gas can be introduced into the tank through a valve connected to the flange.

A third method of manufacture may start with a composite of sorbent formed over a three dimensional grid of thermally conductive metal wires. The protruding wires can be welded to a thermally conducting metal foil that is thermally connected by welding to a metal mounting flange. The resulting system of (flange+grid+foil) can then be encapsulated with polydicyclopentadiene by reaction injection molding and a ring-opening metathesis polymerization. The resulting tank can have an arbitrary shape subject only to constraints on thickness related to tank rupture.

What is claimed is:

1. A method of transferring a gas from a source to a vessel, the method comprising:
   (i) cooling a sorbent material within the vessel;
   (ii) opening a valve to transfer gas by physisorption from the source to the vessel;
   (iii) regulating the temperature of the sorbent material to control the gas transfer;
   (iv) closing the valve connecting the vessel to the source of gas; and
   (v) warming the vessel, sorbent, and gas to produce a predetermined pressure at a selected temperature.

2. The method of claim 1, wherein the storage capacity of the sorbent, defined as the ratio of liter-atmospheres of gas stored to liters of sorbent material volume, is greater than one.

3. The method of claim 1, wherein the sorbent material is one or more of zeolites, porous glass, porous carbon, metal-organic framework materials, microporous polymers, and clay.

4. The method of claim 1, wherein the gas is a hydrocarbon or hydrogen fuel.

5. The method of claim 1, wherein the gas is thermally unstable when subjected to mechanical compression.

6. A system for pumping gas, storing gas, or a combination thereof, the system comprising:
   a sorbent material;
   a thermal conductor in contact with the sorbent material;
   a pressure vessel; and
   a valve configured to connect the pressure vessel to a source of gas;
   wherein the sorbent material and the thermal conductor are disposed within the pressure vessel; and
   wherein the thermal conductor comprises: one or more thermoelectric plates in thermal contact with the sorbent material; a second thermal conductor in thermal contact with the one or more thermoelectric plates; a thermal bath in thermal contact with the second thermal conductor; and a source of electrical power connected to the one or more thermoelectric plates.

7. The system of claim 6, wherein the gas is a fuel whose enthalpy of combustion is greater than zero.

8. The system of claim 6, wherein a pressure transducer is connected to the vessel.

9. The system of claim 6, wherein one or more temperature sensors are connected to the sorbent material.

10. The system of claim 6, further comprising a thermal insulation layer.

11. The system of claim 6, wherein the pressure vessel is configured to be detachable from the source of gas for cooling of the sorbent material in a cooled environment.

12. The system of claim 11, wherein the cooled environment is a refrigerator or a freezer.

13. The system of claim 6, further comprising a second valve providing a fluid connection from the pressure vessel to a second vessel.

14. The system of claim 6, wherein the system is configured for use with a vehicle, a generator, or another platform that requires gas.

15. A method of manufacturing a system according to claim 6, the method comprising:
 (1) placing at least a portion of the sorbent material and at least a portion of the thermal conductor in contact; and enclosing the sorbent material and thermal conductor in the pressure vessel; or
 (2) placing the sorbent material in the pressure vessel including the thermal conductor.

16. The method of claim 15, wherein placing at least a portion of the sorbent material and at least a portion of the thermal conductor in contact comprises:
 (a) packing sorbent material around an array of thermally conductive tubing configured to receive a flow of heat transfer fluid, heat transfer gas, or a combination thereof; or
 (b) forming a composite of sorbent formed over a three dimensional grid of thermally conductive wires.

17. The method of claim 15, wherein placing the sorbent material in the pressure vessel including the thermal conductor comprises filling the pressure vessel with sorbent through a flange.

* * * * *